United States Patent
Noordmans et al.

(10) Patent No.: US 6,676,027 B1
(45) Date of Patent: Jan. 13, 2004

(54) HEATER FOR AIRCRAFT COCKPIT

(75) Inventors: Roland D. Noordmans, Glenwood, MN (US); Gary E. Schmidt, Lake Elmo, MN (US)

(73) Assignee: Schmidt Aircraft Products, Inc., Glenwood, MN (US)

( * ) Notice: Subject to any disclaimer, the term of this patent is extended or adjusted under 35 U.S.C. 154(b) by 0 days.

(21) Appl. No.: 10/331,788

(22) Filed: Dec. 30, 2002

(51) Int. Cl.[7] .................................................. B60H 1/22
(52) U.S. Cl. ........................................... 237/43; 237/69
(58) Field of Search ...................... 237/69, 43; 219/544, 219/546, 548, 549

(56) References Cited

U.S. PATENT DOCUMENTS

| | | | | |
|---|---|---|---|---|
| 2,185,692 A | * | 1/1940 | McCleary | 219/510 |
| 2,619,580 A | | 11/1952 | Pontiere | |
| 2,834,862 A | | 5/1958 | Meyers | |
| 3,255,337 A | * | 6/1966 | Willat | 219/528 |
| 4,114,620 A | * | 9/1978 | Moore et al. | 607/104 |
| 4,158,078 A | | 6/1979 | Egger et al. | |
| 4,247,756 A | | 1/1981 | Cucinotta et al. | |
| 4,646,815 A | * | 3/1987 | Iwata et al. | 165/56 |
| 4,654,511 A | * | 3/1987 | Horsma et al. | 219/548 |
| 4,695,703 A | | 9/1987 | Williams et al. | |
| 4,817,707 A | * | 4/1989 | Aoyama et al. | 165/46 |
| 5,092,271 A | * | 3/1992 | Kleinsasser | 119/508 |
| 5,250,226 A | * | 10/1993 | Oswal et al. | 252/500 |
| 5,902,518 A | * | 5/1999 | Khazai et al. | 252/511 |
| 5,961,869 A | * | 10/1999 | Irgens | 219/549 |
| 5,998,770 A | | 12/1999 | Sundby | |
| 6,073,998 A | | 6/2000 | Siarkowski et al. | |
| 6,434,328 B2 | * | 8/2002 | Rutherford | 392/503 |

\* cited by examiner

*Primary Examiner*—Derek Boles
(74) *Attorney, Agent, or Firm*—Thomas J. Nikolai; Nikolai & Mersereau, P.A.

(57) ABSTRACT

An aircraft cockpit heater in the form of a floor mat is disclosed. The heating element of the heater is designed so that no portion of the heating element will heat to a temperature above a predetermined threshold, said threshold well below the temperature at which combustion can occur.

6 Claims, 3 Drawing Sheets

HEATER FOR AIRCRAFT COCKPIT

BACKGROUND OF THE INVENTION

I. Field of the Invention

This invention relates to heaters for aircraft cockpits. More specifically, this invention relates to a heater in the form of a floor mat that can be used to increase the temperature of the airplane's cockpit to a point where the cockpit is comfortable for passengers and to the point where cockpit equipment will function properly.

II. Description of the Related Art

For aircraft to operate properly, the cockpit needs to be brought up to a suitable operating temperature. This operating temperature is one that will be comfortable for occupants of the cockpit, will allow LED displays to function properly, and will allow other instrumentation to operate properly without being adversely affected by cold temperatures.

In the prior art, a number of problems have been encountered when trying to heat cockpits of smaller aircraft. First, prior art heating devices tend to be very conspicuous. Second, prior art heating devices tend to be designed in such a way that they take up too much of the limited amount of space available in a cockpit. Third, prior art heaters tend to be portable devices that are placed into the cockpit to preheat the aircraft and then removed from the cockpit before the aircraft is actually used for flight.

Another problem with any device used in aircraft is that the device must be used in such a way to essentially eliminate the possibility of any onboard combustion or fire. This increases the difficulty of designing a heater suitable for use in aircraft cockpits.

SUMMARY OF THE INVENTION

The present invention addresses each of the problems of the prior art outlined above. First, the heater of the present invention is inconspicuous, designed in such a way that it does not take up too much of the cockpit's space, may be placed in the cockpit on a permanent or semi-permanent basis, and is designed in such a way where it will not cause any real risk of fire or combustion.

The present invention is designed in the form of a floor mat in which heating elements are embedded. This design allows the heater to remain in the cockpit for extended periods of time and also ensures that little if any usable space of the cockpit is used by the heater of the present invention.

The heater of the present invention has a durable outside cover. Embedded within the cover is a heating element, no portion of which can exceed a predetermined temperature well below the threshold for causing possible combustion of materials coming into contact with the heater. Further details of the present invention can be derived from a review of the following detailed description of the invention in view of the accompanying drawings.

DETAILED DESCRIPTION OF THE PREFERRED EMBODIMENT

Figure 1:
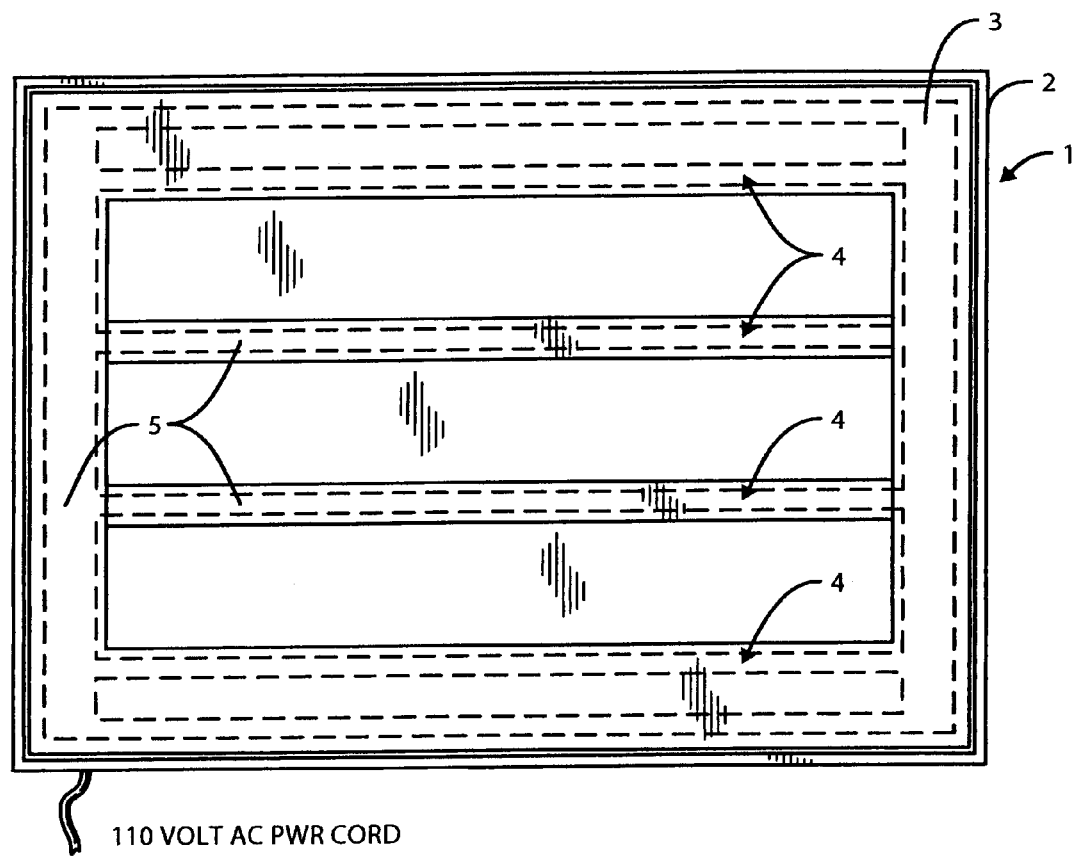
FIG. 1 is a top view of the heater of the present invention.
Figure 2:
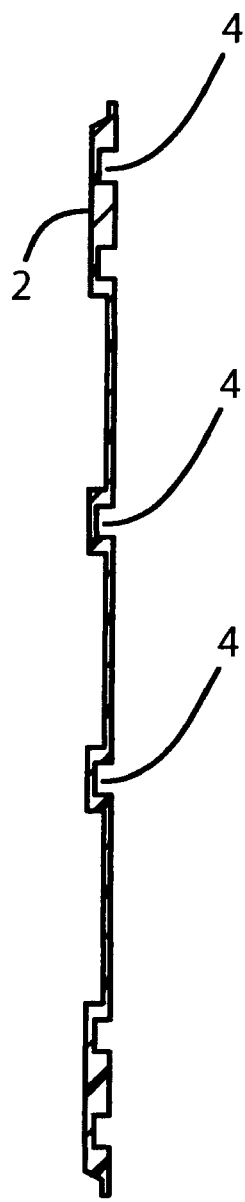
FIG. 2 is a cross-sectional view of the cover of the present invention.

As shown in the drawings, the present invention includes a cover 1. The cover 1 comprises a base member 2 and a top member 3. Included within the cover 1 are a plurality of channels 4. A relatively flat heating element 5 is positioned within the channels. The heating element 5 is intended to be coupled to a 110 volt AC power cord which can be plugged into either the electrical system of the aircraft engine preheater or an auxiliary power source during preheating of the aircraft.

Figure 3:
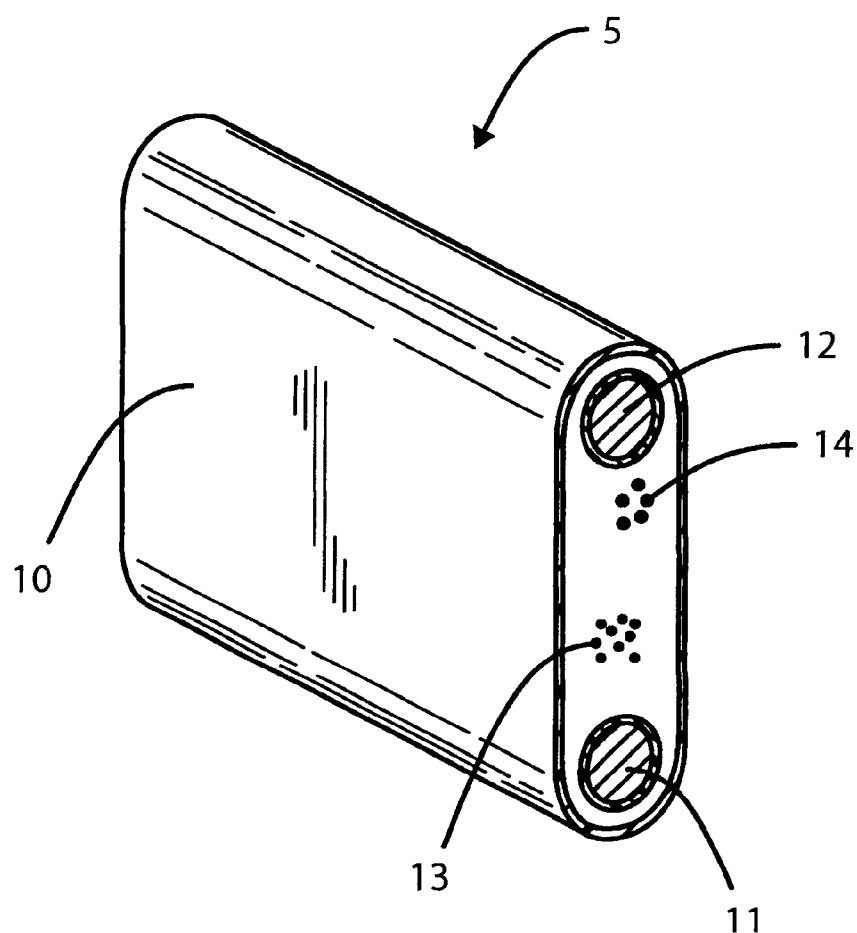
FIG. 3 is a cross-sectional view of the heating element of the present invention.

FIG. 3 shows the construction of the heating element 5. As shown, the heating element 5 has an insulative outer cover 10 and a pair of conductors 11 and 12 running through the inside of the cover 10. Also located on the inside of the cover 10 and separating the conductors 11 and 12 is a filler 13. The material of the filler 13 is generally non-conductive and non-resistive. However, embedded within the filler material are a plurality of resistive particles 14. As electrical current is run through the two conductors 11 and 12, an electrical path is created through the resistive particles 14 causing the heating element 5 to heat. As the heating element 5 heats, the resistive particles 14 move away from each other and away from the conductive members 11 and 12. This is true for all portions of the heating element. Thus, if the temperature of any portion of the heating element exceeds a predetermined threshold, the resistive particles 14 contained within that portion will be so distant from each other that further heating of that portion the heating element 5 will not occur. Heating of other portions of the heating element 5 will continue until such time as those portions reach the predetermined threshold.

Applicant has found that a heating element manufactured by Chromalax Inc. to be particularly suitable for use in the present invention. Specifically, the Chromalax SRS 20-1 type self-regulating medium temperature cable has proven to be very useful. This heating element 5 uses carbon granules in the filler material such that as the material is heated it expands creating space preventing current flow, thus restricting the heat that can be generated by any portion of the heating element. The above-referenced heating element is rated for 230°. This is well below the temperature at which combustion of materials can occur, i.e. approximately 400° F.

The foregoing is intended to provide a general outline of the present invention. Further details related to the construction of the floor mat heater of the present invention are provided below.

The preferred embodiment of the present invention has overall dimensions of 8.5 inches×31 inches×0.4 inches thick. The mat heater of the present invention weighs approximately 1.7 pounds and is capable of producing 250 watts of heat. Both the base member 2 and top member 3 of the outer cover 1 are preferably constructed of 1340 silicone. This provides a tough, durable covering for the heater that is capable of sustaining and handling the wear and tear associated with floor mat usage. The channels 4 of the base member provide about 15 linear feet of space in which approximately 15 linear feet of heating element 5 can be placed. Once the heating element 5 has been placed within the channels 4 of the base member 2, the top member is secured in place by applying a thin layer of silicone to glue the two members together. Heat curing can be utilized to speed and improve or as an alternative the adhering process. Finally, the mat can be trimmed to the desired size.

Generally speaking, two mats of the type outlined above can be used in an aircraft cockpit, one under the pilot's seat and one under the co-pilot's seat. The cover 1 is wear-resistant and has good tear strength. Such an arrangement is capable of increasing the temperature in the cabin by approximately 30° above outside air temperature. Such a temperature increase should generally be adequate to ensure proper operation of cockpit controls and to provide comfort to passengers in the cockpit. Because the device serves as a floor mat, it uses no appreciable space. Given the light weight, the mat does not unduly increase the weight of the aircraft.

Perhaps one of the most significant features of the present invention relates to the manner in which the heater self-regulates its temperature. As indicated above, each portion of the heater is self-regulating. If one portion of the heater reaches the predetermined temperature, that portion of the heating element ceases to increase in temperature. Other portions of the heater, however, continue to increase in temperature until such time that they too reach the predetermined threshold. This is particular advantageous given the nature of items that can rest upon the mat of the present invention. In a typical aircraft environment, one could place jackets, briefcases or the like under the seats. One's feet obviously rest on the floor. Maps, charts and other navigational aids sometimes end up on the floor as do manuals and other kinds of materials.

While all of these items can insulate sections of the heater, those portions of the heater insulated by such items will cease to heat once the predetermined threshold has been reached. Since this threshold is approximately 230° F. and combustion normally begins about 400° F., no such items will be caused to combust by the heater.

In use, the heater of the present invention can be tied to the engine preheater and activated when the engine preheater is plugged in. Of course, it can be wired in a separate fashion without undue difficulty.

Those skilled in the art will recognize that the present invention can be implemented in a number of different ways. The detailed description of the preferred embodiment outlined above is not intended to limiting. Instead, it is intended to meet the requirements of the patent laws and provide an example of how one can embody the present invention. The scope of the invention, however, is defined by the following claims.

What is claimed:

1. A heater for an aircraft cockpit comprising:
   a. a cover having a channel sized to receive a heating element;
   b. a heating element positioned within said channel of said cover, said heating element having an insulative outer cover, at least two conductors, and a filler material separating said conductors and containing resistive particles, wherein the temperature of each portion of the heating element is self-regulating such that if a portion of the heating element exceeds a predetermined threshold which is low enough to prevent combustion of materials coming into contact with said heater, that portion will cease to increase in temperature while other portions continue to increase in temperature until they reach the predetermined threshold.

2. The heater of claim 1 wherein the temperature of each portion of the heater is independently regulated such that portions not yet at the predetermined threshold will continue to heat even if another portion has reached said threshold.

3. The heater of claim 1 wherein said heater is in the form of a floor mat for said aircraft cockpit.

4. The heater of claim 1 wherein said cover is made of silicone.

5. The heater of claim 1 wherein said cover has a base member and a top member joined to each other and surrounding said heating element.

6. The heater of claim 1 wherein said heating element is coupled to a power cord.

\* \* \* \* \*